UNITED STATES PATENT OFFICE.

HENRI CROT, OF CULLY, ASSIGNOR TO LA SOCIÉTÉ ANONYME LA VINICOLE, OF VEVAY, SWITZERLAND.

PROCESS OF OBTAINING SPARKLING WINE.

SPECIFICATION forming part of Letters Patent No. 308,594, dated December 2, 1884.

Application filed September 19, 1883. (No specimens.) Patented in France August 18, 1883, No. 157,104.

*To all whom it may concern:*

Be it known that I, HENRI CROT, of Cully, Switzerland, have invented an Improved Process of Obtaining Sparkling Wine or Factitious Champagne-Wine, of which the following is a specification.

This new process allows me to obtain at any time sparkling wine or factitious "champagne" by making the same work directly in vessels of a great capacity. The wine so manufactured is ready for bottling and prevents the high expense attendant upon the preservation of wine and the losses connected therewith, both these drawbacks being inseparable from the process hitherto employed. In cylinders of tinned sheet-iron, capable of sustaining a pressure of at least twelve atmospheres, and lined inside with a coating of varnish for the purpose of preventing any contact of the liquid and metal, I place a mixture in a proportion that depends on the kind of wine used, consisting of old wine—that is, wine which has been made one or more years—and condensed must—that is, juice of grapes from which has been taken four or five parts of water by evaporation in a vacuum. The proportions of old wine and condensed must vary according to the quality of wine, generally ninety to ninety-five per cent. of old wine to ten to five per cent. of condensed must. The cylinders are placed in a stove, the temperature of which is brought by degrees up to 25° centigrade and maintained at such height. The "working" or fermentation will then rapidly occur and produce the desired pressure, and in from twenty to twenty-five days after it will be completed. At that instant the wine, the pressure of which is being kept at about six atmospheres, is decanted into another cylinder maintained under a uniform pressure, so that it may be cooled and cleared therein by means of an ordinary tannic fining process. After this last-mentioned operation the champagne obtained will be unobjectionable as to limpidity, sparkling properties, taste, and capability of preservation, and will stand the longest voyages and the greatest variety of temperatures.

It is hardly necessary to add that the drawing off and stoppering of the bottles are effected by pressure, any contact with the air being carefully avoided.

Having thus fully described my invention, what I claim, and desire to secure by Letters Patent, is—

1. A process for the rapid manufacture of factitious champagne-wines, consisting in the introduction into receivers made of tinned and varnished sheet-iron of a mixture of old wine and condensed must in the proportion of, say, from five to fifteen per cent. of must, more or less, substantially as set forth.

2. The heating of such mixture and the maintenance of the temperature at about 25° centigrade, for the purpose of causing thereby a rapid working or fermentation and the consequent pressure for a space of from twenty to twenty-five days, substantially as set forth.

3. The cooling of the liquid effected by its transfusion into another reservoir, and the tannic fining process, substantially as and for the purpose hereinbefore stated.

In testimony whereof I have signed my name to this specification before two subscribing witnesses.

HENRI CROT.

Witnesses:
DAVID T. S. FULLER,
ALBERT CAHEN.